Jan. 26, 1937.  C. E. STEVENS  2,068,715
VEHICLE BODY STRUCTURE
Filed July 17, 1934  3 Sheets-Sheet 2
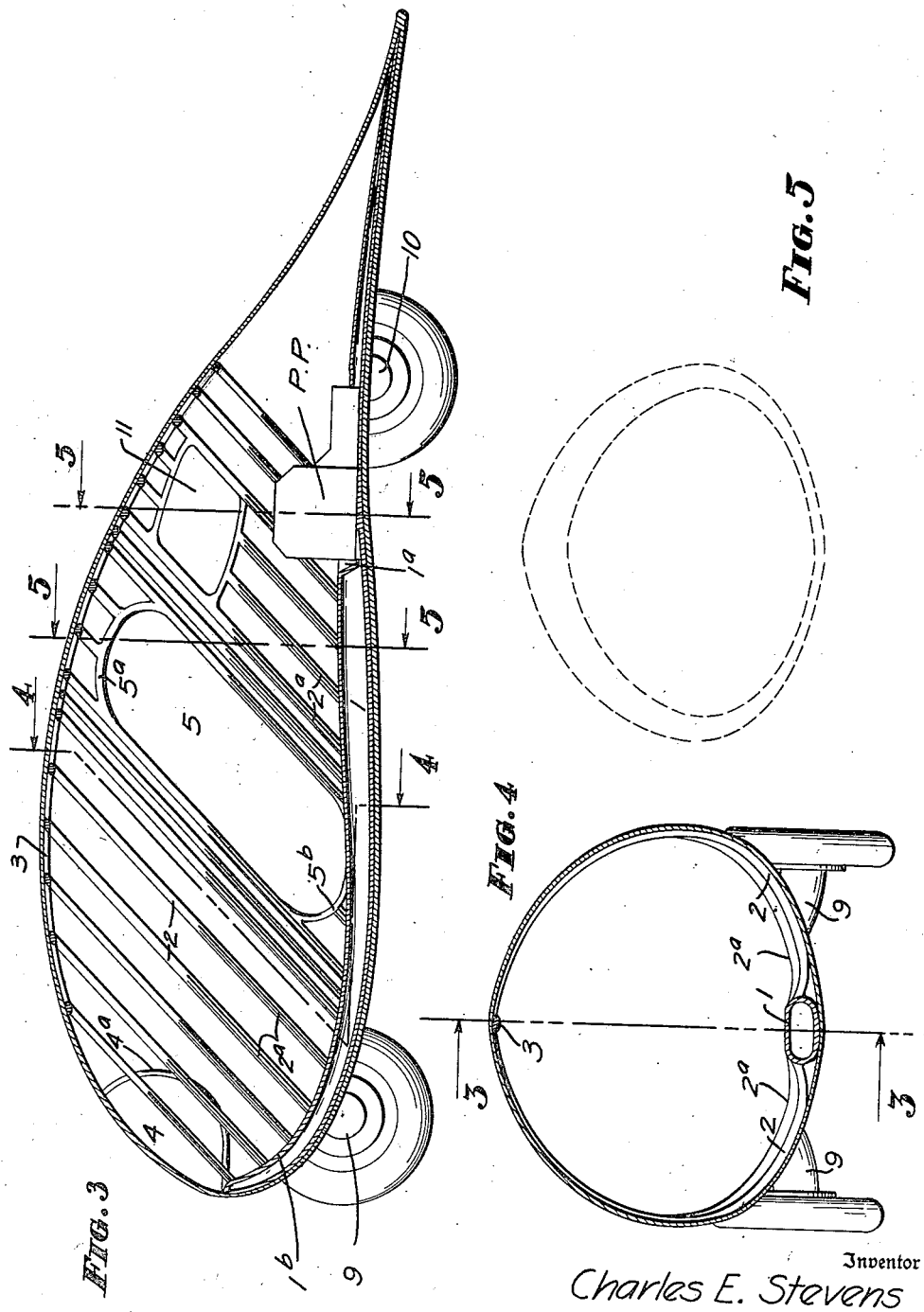
Inventor
Charles E. Stevens
By A. B. Bowman
Attorney Jan. 26, 1937. C. E. STEVENS 2,068,715
VEHICLE BODY STRUCTURE
Filed July 17, 1934 3 Sheets-Sheet 3
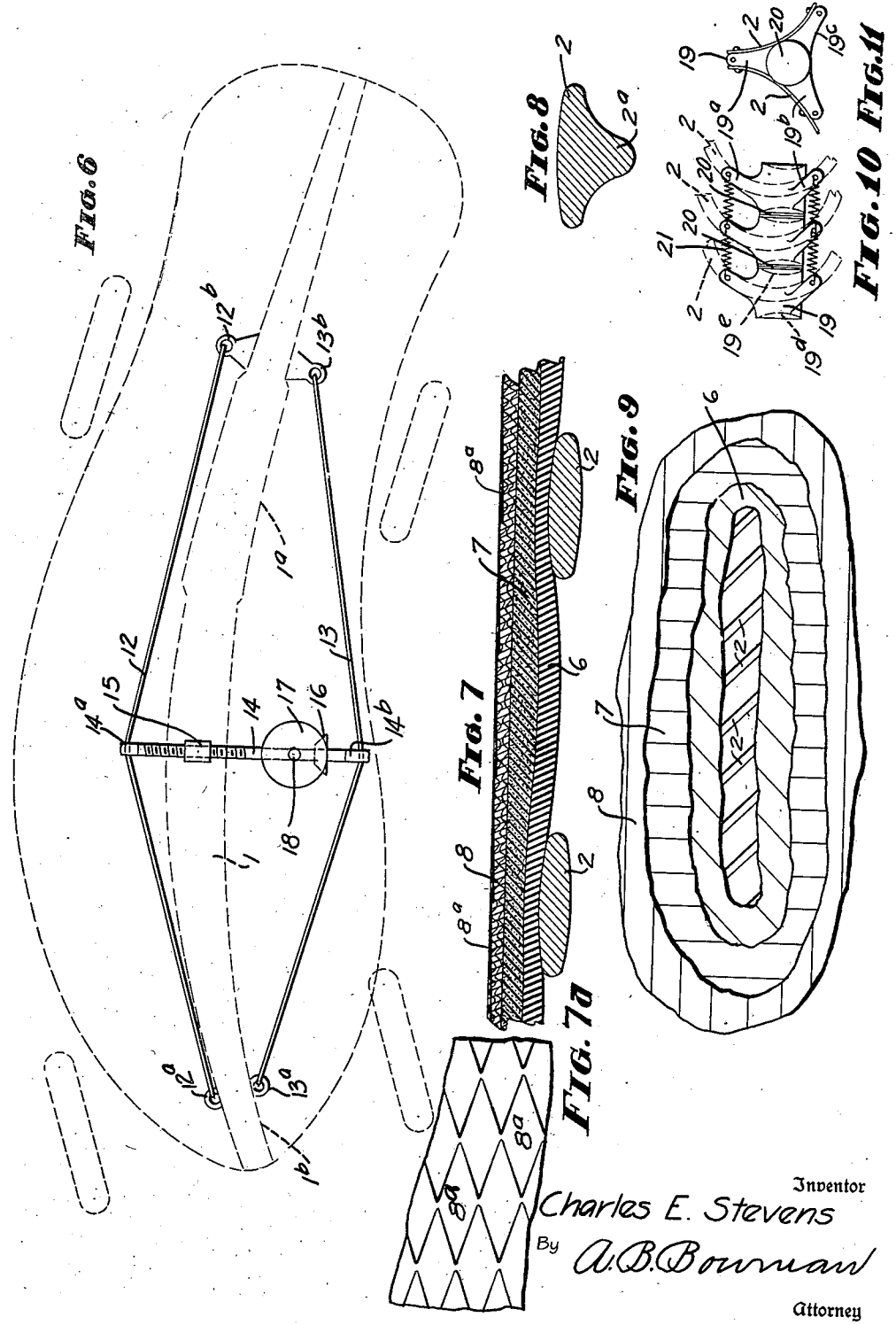
Inventor
Charles E. Stevens
By A. B. Bowman
Attorney Patented Jan. 26, 1937

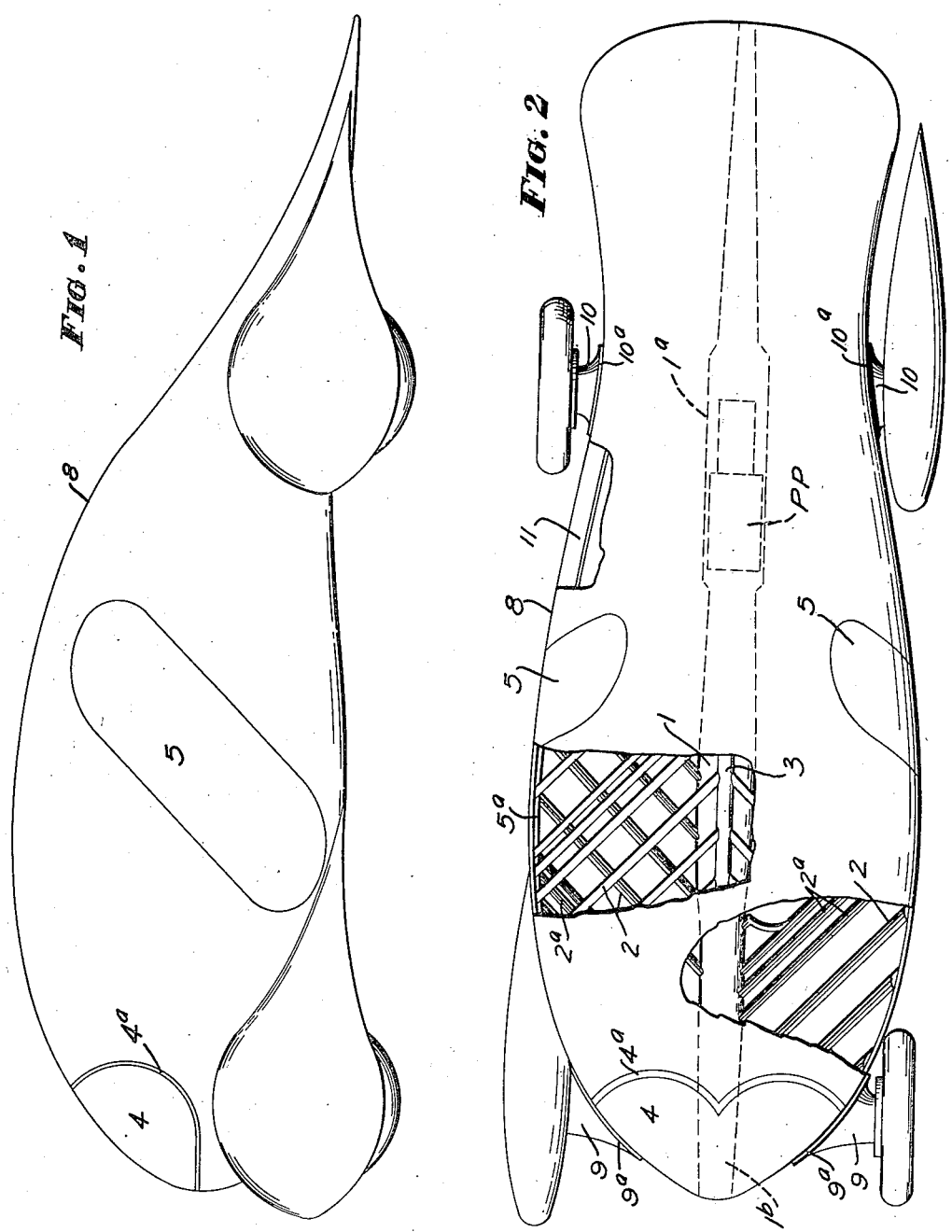

2,068,715

UNITED STATES PATENT OFFICE 2,068,715

VEHICLE BODY STRUCTURE

Charles E. Stevens, Hawthorne, Calif.

Application July 17, 1934, Serial No. 735,548

19 Claims. (Cl. 296—28)

My invention relates to body structures for vehicles, and the objects of my invention are:

First, to provide a vehicle body which is so constructed that it is particularly adapted for extreme streamlining;

Second, to provide a vehicle body of this class which is so constructed and arranged that it will pass through the fluid medium with a minimum of fluid resistance;

Third, to provide a vehicle body of this class in which the surface of the body is constructed and arranged to provide a minimum of skin friction and turbulence;

Fourth, to provide a vehicle body of this class which is flexible and resilient throughout in every direction;

Fifth, to provide a vehicle body of this class in which the surface is flexible and resilient and therefore not easily damaged by impact or collision;

Sixth, to provide a vehicle body of this class which is so shaped and constructed that it tends to deflect any object contacting therewith;

Seventh, to provide a vehicle body of this class which can be built very light but strong and durable;

Eighth, to provide a vehicle body of this class which is so shaped, constructed and arranged that it is adaptable for use in either air or water with but slight changes;

Ninth, to provide a vehicle body of this class in which the outer surface provides a maximum of curved surfaces and avoids straight lines or angles;

Tenth, to provide a vehicle body of this class in which the whole body may be distorted or turned when steering the vehicle;

Eleventh, to provide a vehicle body which is so shaped, arranged and constructed that it may be constructed with its major body portion intermediate the ends and tapering in curved form forwardly and rearwardly therefrom;

Twelfth, to provide a vehicle body of this class in which each and every part of the body is subject to warping or distortion;

Thirteenth, to provide a vehicle body of this class in which the power plant may be positioned either in the front or rear portion of the vehicle body as desired;

Fourteenth, to provide a vehicle body of this class in which the steering may be accomplished by warping action of the body or portions thereof; and Fifteenth, to provide a vehicle body of this class which is very simple and economical of construction, efficient in its action, durable, and light of construction in accordance with its strength.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my vehicle body in the form of an automobile body; Fig. 2 is a top or plan view thereof showing portions broken away and in section to facilitate the illustration; Fig. 3 is a longitudinal sectional view through the middle thereof and showing some of the parts diagrammatically and in elevation to facilitate the illustration; Fig. 4 is a transverse sectional view through 4—4 of Fig. 3; Fig. 5 is a diagrammatic outline in dotted lines of the sectional outlines through 5—5 and 5—5 of Fig. 3 of the drawings; Fig. 6 is a diagrammatic plan view of the vehicle body showing it in warped or distorted form in making a short turn and showing graphically the arrangement for distorting or warping the body for steering the same; Fig. 7 is an enlarged sectional view of the outer covering of the vehicle and showing the supporting ribs in their relation therewith; Fig. 7a is a detailed fragmentary outer side view of the outer covering showing impressions in the surface; Fig. 8 is a sectional view of one of the ribs reinforced towards its main supporting member; Fig. 9 is a fragmentary portion of the outer covering of the vehicle body showing portions broken away inwardly from the outer surface to the ribs supporting the same; Fig. 10 is a side elevational view on an enlarged scale of a fragmentary portion of the main supporting beam in a modified form from that of the other figures of the drawings, and Fig. 11 is an end view thereof.

Similar characters of reference refer to similar parts and portions throughout the several views of the drawings.

The main supporting beam 1 is preferably a hollow in cross section member made of spring steel, the cross section being shown best in Fig. 4 of the drawings. It is constructed relatively large at the major portion of the body intermediate the ends and gradually tapers forwardly and backwardly therefrom, as shown by solid and dotted lines in Fig. 2 of the drawings and in Fig.

6 of the drawings, and is shaped to form the lower middle portion of the structural part of the body, as shown best in Fig. 3 of the drawings. It is provided with a rear portion in this particular structure in which the power plant is mounted near the rear axle with a widened reinforced portion 1a just forwardly of the rear axle of the vehicle in the body, then gradually tapering to the extreme rear end of the vehicle body. It will be noted that the front portion is curved conforming to the body at 1b. Secured to the opposite sides of this member 1 are a plurality of rib members 2 which extend downwardly and outwardly, then upwardly and outwardly in curved form and backwardly on an angle of approximately forty-five degrees and are secured at their extended ends at the middle of the upper side to the rib connecting member 3.

It will be here noted that these rib members may be secured to both the members 1 and 3 either rigidly or may be connected to lugs secured to the member 1 and the ribs secured to these lugs so that they may be easily replaced. The rib connecting member 3 is preferably a solid thin oval shaped member, as shown best in Fig. 4 of the drawings and is positioned longitudinally of the body along the middle of the upper side. This member 3 is also preferably made of spring steel and adapted to give or warp to a certain extent upon pressure thereupon in a flexure manner. These ribs 2 are spaced from three to four inches apart in the conventional body and are also made of spring steel and oval in shape, as shown best in Fig. 7 of the drawings. However, they may be provided with reinforced rib portions 2a, as shown best in Fig. 8 of the drawings, down toward their connection with the member 1 and gradually converge into the oval form outwardly therefrom. It will be noted however, that where greater strength is required on the outer surface of the body the ribs may be placed in closer relation, as shown on the opposite sides of the door openings in Fig. 3 of the drawings. The door frames around the doors at the opposite ends are also provided with transverse rib portions 5a and 5b connected to these rib members 2 at the opposite sides of the door and short rib portions from the members 1 and 3 connect with these transverse rib portions 5a and 5b, all as shown best in Figs. 2 and 3 of the drawings.

It will be here noted that the doors 5 are positioned on an angle parallel with the ribs and extending around at the same curvature as the exterior of the body, the door being shaped to conform to the outer surface of the body on this particular angle, as shown in Figs. 1 and 3 of the drawings. It will also be noted that there is no side step to the body but the occupant may step directly into the body through the door.

At the upper front end of the body from the front end of the member 1 upwardly and extending around to the sides and upwardly is a window 4 which is preferably composed of a transparent nonbreakable material such as celluloid or other transparent material which is supported by a frame 4a, as shown in Figs. 1, 2 and 3 of the drawings, which frame may be of spring steel similar to the ribs and their supports and oval shaped; it being noted that some portions of these members 4 will extend over the forward ribs 2 in some places and be secured thereto by any conventional means. The ribs 2 and outer covering consisting of the members 6, 7 and 8, may be omitted and a flexible radiator member composed of rubber or other flexible material positioned as shown by the reference character 11 in Fig. 2 of the drawings which radiator may connect with the engine of the power plant in any conventional manner.

The doors 5 may also be provided with windows movable upwardly and downwardly therein in the conventional manner, although considerable lateral play may be required because of the variable curvature of the door in conformity with the shape of the outer surface of the body.

The ribs 2 and members 1 and 3 are covered with a flexible resilient covering preferably of three-ply as follows and as shown best in Figs. 7 and 9 of the drawings: the first layer is preferably composed of tension rubber which is stretched tightly over the ribs so that it tends to extend inwardly and fits tightly against the outer surface of the ribs and holds the whole structure in tension, as shown best in Fig. 7 of the drawings. This rubber is preferably positioned thereon in strips positioned at right angles to the ribs, as shown best in Fig. 9 of the drawings, it being noted that the complete body is covered thus with these layers of rubber in tension except the windows, doors, radiator and other necessarily exposed surfaces. This provides a resilient, water-tight, yieldable covering for the frame of said body. Then positioned over this layer 6 is another layer 7 of strips which are positioned at right angles to the members 1 and 2 and this layer is preferably a thin layer of sponge rubber which provides a cushion for any impact against the body and covers all or any essential portion of the body over the layer 6. Then over this layer 7 is provided another layer of covering which should be a water-tight covering and preferably reinforced or coated with a rubber filler to make it water tight. This outer layer 8 is applied in strips preferably at right angles to the layer 7 and longitudinally with the body of the vehicle and covers the whole of the body or any essential parts, it being noted that the door may be covered with either or all three of these layers 6, 7 and 8, thus providing a vehicle body with the outer covering forming a cushion throughout the whole of the body. The outer surface of the layer 8 is provided with a plurality of associated substantially streamline shaped impressions 8a which are approximately one-thirty-second of an inch deep at their front ends and practically feather out at their rear ends, as shown best in Figs. 7 and 7a of the drawings, which break up the continuity and reduce to a minimum the turbulence on the outer surface of the body.

The front wheel supports 9 are secured to the front lower portion of the body by means of flanges 9a secured to the ribs 2 at the proper position and may be secured either directly to the ribs in any conventional manner or through the ribs over the covering consisting of any one or all of the layers 6, 7 or 8, and the wheels are connected with the supports 9 in any conventional manner as they simply roll on an axle rigid with said support 9 and the vehicle is steered by warping the main supporting beam 1 and therefore the connecting member 3 and the body structure as a whole, as shown best in Fig. 6 of the drawings, turning the wheels with the body in turned relation as also shown in Fig. 6 of the drawings. The supports 10 are secured to the body at the rear axle portion in the same manner as the supports 9 by means of the flanges 10a. However, the rear wheels are supported on an axle which extends through the supports 10 to a differential in the conventional manner and connected with the power plant by universal ball joint in the conventional manner, not shown, the power plant being shown diagrammatically as designated P. P. in Fig. 2 of the drawings. It will be here noted that the portion of the member 1 is reinforced at 1a and broadened so that it will not bend appreciably with the warping of the beam 1 in turning the vehicle. It will also be noted that this beam 1 is made so that its flexure strength and rigidity is at that portion of the vehicle in which the least expanding takes place. Therefore this beam is proportioned throughout its length for strength as is required to provide the proper curvature and warping for the proper steering of the vehicle and keeping the wheels in proper position when turning.

As heretofore stated, the vehicle is steered by warping the body and the body is warped by warping the main supporting beam 1 of said body. Applicant has provided one of several means for warping said beam as follows: As shown graphically in Fig. 6 of the drawings, the beam is shown in warped position by means of cables 12 and 13 which are preferably wire cables secured to links 12a and 13a at their one ends and 12b and 13b at their opposite ends, which loops 12a, 13a, 12b and 13b are secured to the beam 1. These cables 12 and 13 are substantially the same length and slightly longer than the distance between the links 12a and 12b, or 13a and 13b, and near the heavier parts of the beam 1 and major portion of the body of the vehicle these cables pass through swivel members 14a and 14b which are swivelly connected to a screw member 14. This screw member 14 is threaded into a nut 15 which is secured to the beam 1 preferably at the upper side thereof. Mounted on the screw member 14 is a bevel gear 16 which meshes with another bevel gear 17 and the bevel gear 17 is mounted on a steering shaft 18 which extends upwardly to a position to be turned by the driver of the vehicle. Thus upon the revolving of the gear 17 the screw member 14 will be turned which in turn will draw the nut 15 together with the beam 1, the screw 14 forming a strut between the cable intermediate its ends and the nut 15 on the beam, thus providing means for warping the beam in either direction as desired.

In Figs. 10 and 11 are shown fragmentary side elevational and end elevational views of a portion of the beam in modified form from that of Fig. 1. In this case the beam consists of a plurality of sections 19 positioned end to end the main body portion of which is cylindrical but may be oval shaped if desired, and each section is provided with arms 19a, 19b and 19c which extend outwardly radiating from the center of the section, as shown best in Fig. 11 of the drawings, but are positioned at an angle to the right angle of the axis, as shown in Fig. 10 of the drawings. Each of the sections 19 is provided with recesses 19d and 19e at its opposite ends in which is mounted a cushion member 20 which is composed of rubber which forms a resilient flexible joint between the separate sections and is held in position by reason of the recesses 19d and 19e in the joining sections and the sections are held together by means of springs 21 connecting the arms on the adjoining sections, as shown best in Fig. 10 of the drawings. Secured to these sections 19 are the ribs 2 in any conventional manner and take the same form on an angle as shown best in Figs. 2 and 3 of the drawings. Applicant has shown them riveted to the arms 19a, 19b and 19c, it being noted that the arms 19a extend upwardly along the middle of the body, while the 19b and 19c extend outwardly and downwardly and support the ribs in outwardly and downwardly curved position similar to that shown in Fig. 4 of the drawings where the ribs are connected to the solid beam 1.

Though I have shown and described a particular construction, combination and arrangement of parts and portions, and a certain modification thereof, I do not wish to be limited to this particular construction, combination and arrangement nor to the modified construction, but desire to include in the scope of my invention the construction, combination and arrangement substantially as set forth in the appended claims.

Having thus described my invention, I claim as new and desire to secure by Letters Patent is:

1. In an automobile body, a warpable hollow automobile frame, said frame being curved in transverse cross section and warpable both vertically and transversely.

2. In a vehicle body, a warpable hollow frame, means for warping said frame for steering a vehicle, and a resilient tension covering enclosing said frame.

3. In an automobile body, a warpable hollow automobile frame, means for warping said frame for steering the automobile, and a resilient tension covering for said frame, said resilient tension covering consisting of several layers in strips running in different directions superposed one upon another.

4. In a vehicle body of the class described, a warpable beam member extending longitudinally at the lower side of said body at the middle thereof and conforming to the shape of the body, another relatively small beam at the upper side of the body warpable therewith, and a plurality of curved ribs connecting said beams and extending backwardly and upwardly from the lower beam to the upper beam on an angle.

5. In a vehicle body, a resilient hollow enclosure frame subject to distortion, and manually operated means in connection with said frame for distorting the same for steering the vehicle.

6. In a vehicle body, a resilient hollow frame subject to distortion, manually operated means in connection with said frame for distorting the same for steering the vehicle, and a cushion tension covering enclosing said frame.

7. In a vehicle body, a resilient hollow frame subject to distortion, means in connection with said frame for distorting the same for steering the vehicle, and a cushion tension covering for said frame, said cushion tension covering including a layer of rubber in tension over said frame.

8. In a vehicle body, a resilient hollow frame subject to distortion, means in connection with said frame for distorting the same for steering the vehicle, and a cushion tension covering for said frame, said cushion tension covering including a layer of rubber in tension over said frame, and a layer of sponge rubber over said tension rubber.

9. In a vehicle body, a resilient hollow frame subject to distortion, means in connection with said frame for distorting the same for steering the vehicle, and a cushion tension covering for said frame, said cushion tension covering including a layer of rubber in tension over said frame, a layer of sponge rubber over said tension rubber, and a fabric covering over said sponge rubber layer.

10. In a vehicle body, a main supporting frame member extending longitudinally of the body warpable throughout its length, and a plurality of resilient ribs secured thereto and extending therefrom to form a hollow body.

11. In a vehicle body, a main supporting frame member extending longitudinally of the body warpable throughout its length, a plurality of resilient ribs secured thereto and extending therefrom to form a hollow body, and a cushion covering for said ribs.

12. In a vehicle body, a main supporting frame member extending longitudinally of the body warpable throughout its length, a plurality of resilient ribs secured thereto and extending therefrom to form a hollow body, and a cushion covering for said ribs consisting of a resilient layer of elastic material in tension secured over and covering said ribs.

13. In a vehicle body, a main supporting frame member extending longitudinally of the body warpable throughout its length, a plurality of resilient ribs secured thereto and extending therefrom to form a hollow body, a cushion covering for said ribs, and a means in connection with said main supporting frame member for warping the same for steering the vehicle.

14. In a vehicle body, a main supporting frame member extending longitudinally of the body warpable throughout its length, a plurality of resilient ribs secured thereto and extending therefrom to form a hollow body, a cushion covering for said ribs consisting of a resilient layer of elastic material in tension secured over and covering said ribs, and a means in connection with said main supporting frame member for warping the same for steering the vehicle.

15. In a vehicle body, a main supporting frame member extending longitudinally of the body warpable throughout its length, a plurality of resilient ribs secured thereto and extending therefrom to form a hollow body, a cushion covering for said ribs consisting of a resilient layer of elastic material in tension secured over and covering said ribs, and a means in connection with said main supporting frame member for warping the same for steering the vehicle, said means for warping consisting of cables secured to the opposite sides of said main supporting member near its extremities, and screw means in connection with said main supporting member and said cables turnable for warping said main supporting member.

16. In a vehicle body, a main supporting frame member extending longitudinally of the body at the lower side thereof throughout its length and conforming to the lower side of said body at the middle of said body, said supporting frame member being flexible and warpable throughout its length, and a plurality of resilient ribs secured thereto at opposite sides and extending downwardly and outwardly then backwardly and upwardly to the middle of the upper side of said body.

17. In a vehicle body, a main supporting frame member extending longitudinally of the body at the lower side thereof throughout its length and conforming to the lower side of said body at the middle of said body, said supporting frame member being flexible and warpable throughout its length, a plurality of resilient ribs secured thereto at opposite sides and extending downwardly and outwardly then backwardly and upwardly to the middle of the upper side of said body, and a flexible and warpable tie connecting said rib members at the middle of the upper portion of said body.

18. In a vehicle body, a main supporting frame member extending longitudinally of the body at the lower side thereof throughout its length and conforming to the lower side of said body at the middle of said body, said supporting frame member being flexible and warpable throughout its length, a plurality of resilient ribs secured thereto at opposite sides and extending downwardly and outwardly then backwardly and upwardly to the middle of the upper side of said body, a flexible and warpable tie connecting said rib members at the middle of the upper portion of said body, and a cushion covering for said ribs consisting of a resilient layer of elastic material in tension secured in strips over and covering said ribs, said strips positioned substantially at right angles to said ribs, a layer of cushion material over said elastic material composed of strips positioned substantially at right angles to the longitudinal axis of said body, and a fabric covering over said cushion material composed of strips extending substantially longitudinally of said body.

19. In a vehicle body, a hollow body frame, a main supporting warpable frame member extending longitudinally of the body and connected thereto at its lower side only throughout its length.

CHARLES E. STEVENS.